United States Patent

Unrath

[11] Patent Number: 6,098,767
[45] Date of Patent: Aug. 8, 2000

[54] CUSHION FOR CRASH ATTENUATION SYSTEM

[75] Inventor: Albert W. Unrath, Line Lexington, Pa.

[73] Assignee: Albert W. Unrath, Inc., Colmar, Pa.

[21] Appl. No.: 08/990,506

[22] Filed: Dec. 15, 1997

[51] Int. Cl.[7] .................................................. F16F 7/12
[52] U.S. Cl. ........................ 188/377; 293/133; 188/371
[58] Field of Search ................................. 188/377, 37.1; 293/118, 102, 133; 267/136, 139; 49/9, 49

[56] References Cited

U.S. PATENT DOCUMENTS 4,711,481  12/1987  Krage et al. ............................ 293/188

FOREIGN PATENT DOCUMENTS

2083162  3/1982  United Kingdom ................... 188/371

Primary Examiner—Robert J. Oberleitner
Assistant Examiner—Devon Kramer
Attorney, Agent, or Firm—Edward J. Howard; Buchanan Ingersoll PC

[57] ABSTRACT

A crash attenuator adapted to be mounted on a vehicle to attenuate some of the energy of an impact, the crash attenuator includes a frame adapted to be mounted on a vehicle; a slider mounted on the frame to slide in response relative to the frame toward the vehicle in response to an impact; a collapsible, energy-absorbing member positioned between the slider and the frame to absorb energy as the slider telescopes relative to the frame; and a crushable, energy-absorbing crash cushion on the outboard side of the slider.

17 Claims, 8 Drawing Sheets

CUSHION FOR CRASH ATTENUATION SYSTEM

BACKGROUND AND SUMMARY OF THE INVENTION

This invention relates to vehicle-mounted crash attenuation systems.

Crash attenuation devices have been developed for mounting on vehicles that are parked or moving slowly on roadways, for example at construction or maintenance sites, in order to attenuate the impacts from collisions with the parked vehicle. Often times, vehicles equipped with crash attenuators are purposely deployed around work sites to shield workers at the site from being hit. Instead, errant vehicles strike the attenuator which arrests the motion of the vehicle and dissipating its impact energy. Examples of these attenuation devices are disclosed in U.S. Pat. Nos. 5,052,732, 4,635,981, and 4,658,941 incorporated herein by reference.

In order to accommodate impacts at highway speeds, attenuation devices need to be quite large. Because of the difficulty in operating vehicles with a large attenuation device extending from vehicle, these attenuation devices are often pivotally mounted on vehicles, so that they can be pivoted into a vertical position so that the vehicle can be more easily moved., While crash attenuation devices have proven to be valuable both in protecting workers at work sites and in protecting motorists, those presently available still have a number of problems. One such problem is that the attenuation devices are easily damaged, and repair or replacement of the damaged devices can be expensive. Many of these attenuation devices were subject to vibration damage from the movement of the vehicles onto which they were mounted. A further problem is that many of these devices are incapable of completely attenuating high speed impacts, and many do not come close to comply with the 65 mph impact standards (NCHRP-350) recently promulgated by the U.S. Department of Transportation.

The crash attenuation device of the present invention is adapted for mounting on a vehicle to attenuate the impacts from collisions. Generally, the attenuation device of the present invention comprises a frame adapted to be mounted on the vehicle, and a slider mounted on the frame to slide relative to the frame toward the vehicle in response to an impact. At least one collapsible, energy-absorbing member positioned between the slider and the frame to absorb energy as the slider telescopes relative to the frame. A crushable, energy-absorbing crash cushion is mounted on the outside side of the slider.

The crushable, energy-absorbing crash cushion is preferably pivotally mounted on the slider to pivot between a horizontal position deployed position in which the crash cushion extends horizontally to intercept impacts, and a vertical storage position in which the crash cushion extends generally vertically to facilitate movement of the vehicle. The crash cushion preferably comprises at least two sections of different energy absorption capability. Replaceable cartridges are preferably mounted on the back and rear sides of the crash cushion to absorb minor impacts without making the entire crash cushion unserviceable.

The crash attenuation device of the present invention arrests the motion of the impacting vehicle and dissipates its impact energy. The device is stable and resists damage induced from movement of the vehicle on which it is mounted. The device can be easily and simply repaired, rather than requiring replacement upon minor collisions. These and other features and advantages will be in part apparent, and part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENTS

Figure 1:
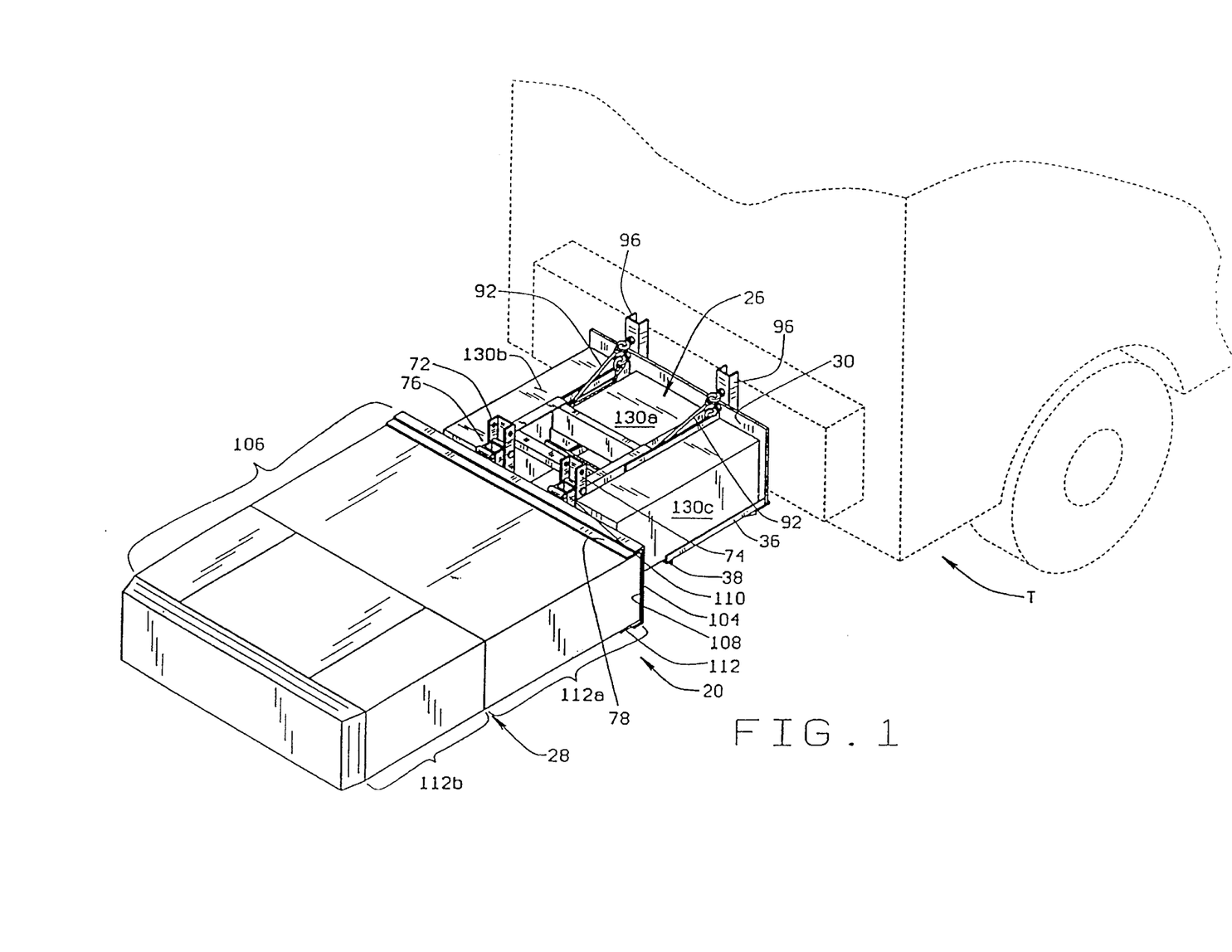
FIG. 1 is a perspective view of a first embodiment of a crash attenuation system constructed according to the principles of the present invention, shown as it would be mounted on a vehicle.

A first embodiment of a crash attenuator constructed according to the principles of this invention is indicated generally as 20 in FIGS. 1–8. As shown in FIG. 1, the crash attenuator 20 is adapted to be mounted on a vehicle, such as truck T, and deployed in order to arrest the motion of a vehicle colliding with the attenuator and dissipate its impact energy.

As shown in FIGS. 1–8 the crash attenuator generally comprises a frame 22 adapted to be mounted on a vehicle, and a slider 24 mounted on the frame to telescope relative to the frame toward the vehicle in response to an impact. At least one collapsible, energy-absorbing member 26 is positioned between the slider 24 and the frame 22 to absorb energy as the slider telescopes relative to the frame. A crushable, energy absorbing crash cushion 28 is provided on the outboard side of the slider.

Figure 2:
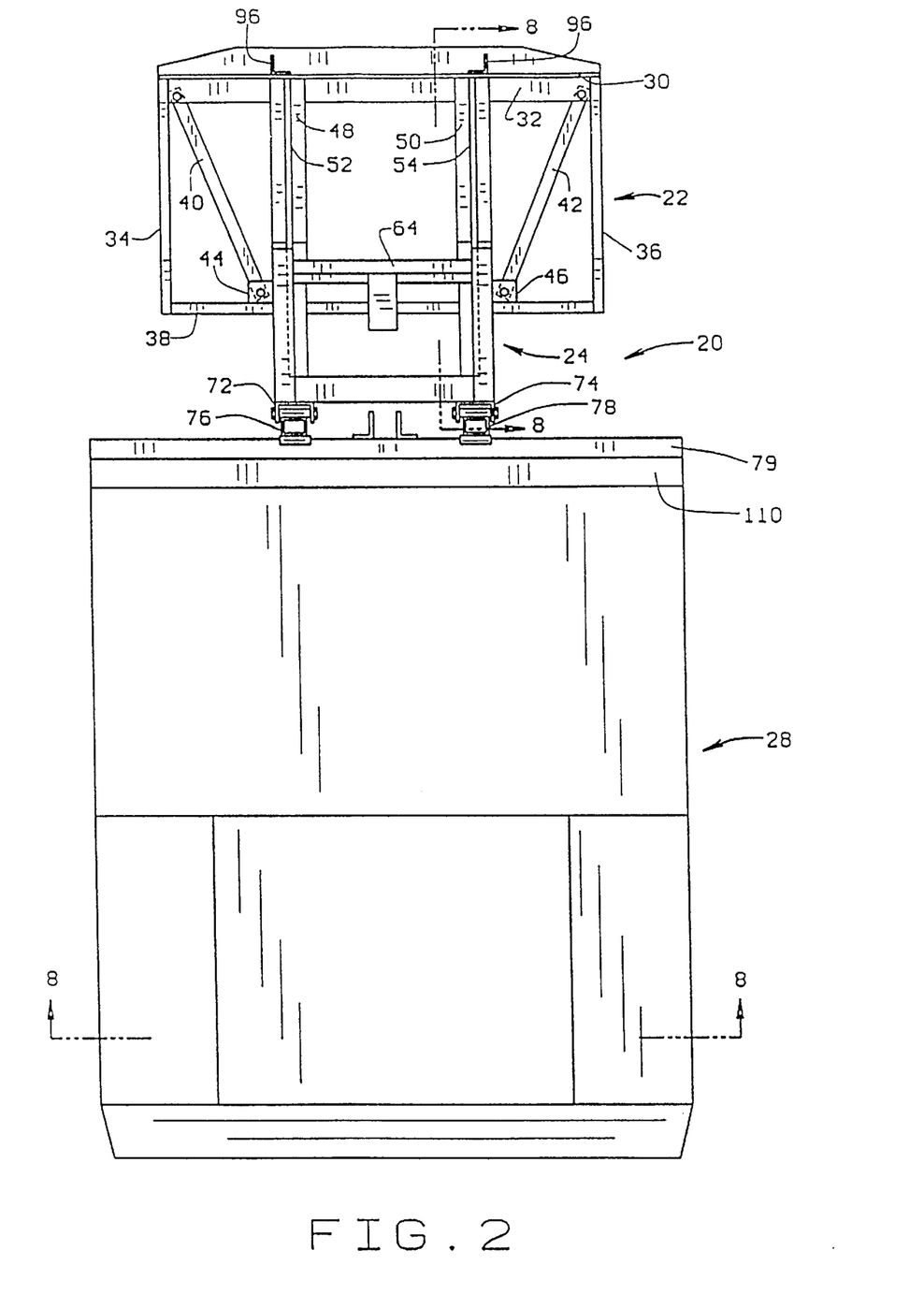
FIG. 2 is top plan view of the crash attenuation system.
Figure 3:
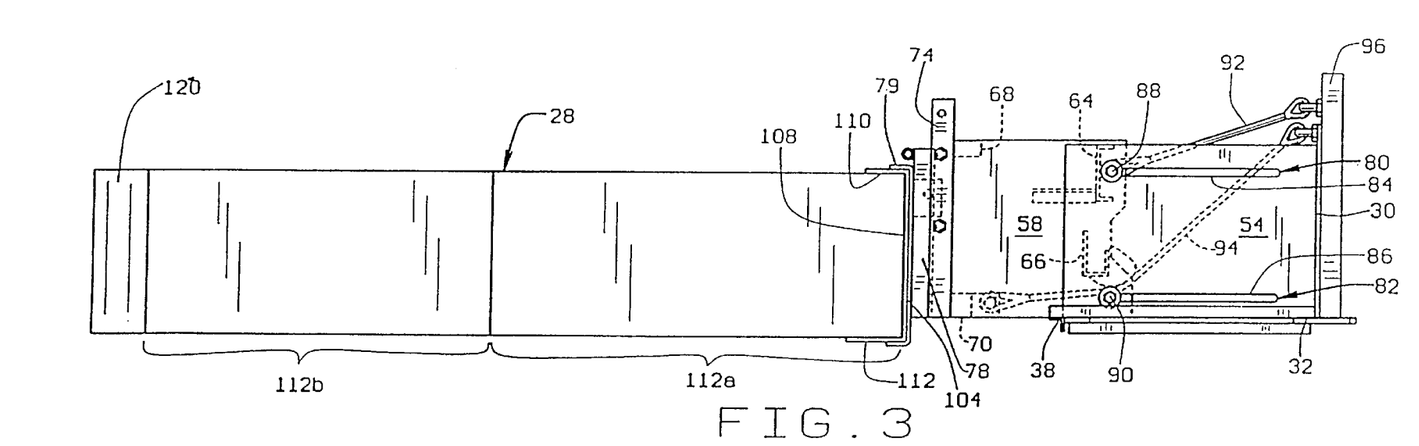
FIG. 3 is a right side elevation view of the crash attenuation system, in its deployed position.
Figures 4, 5:
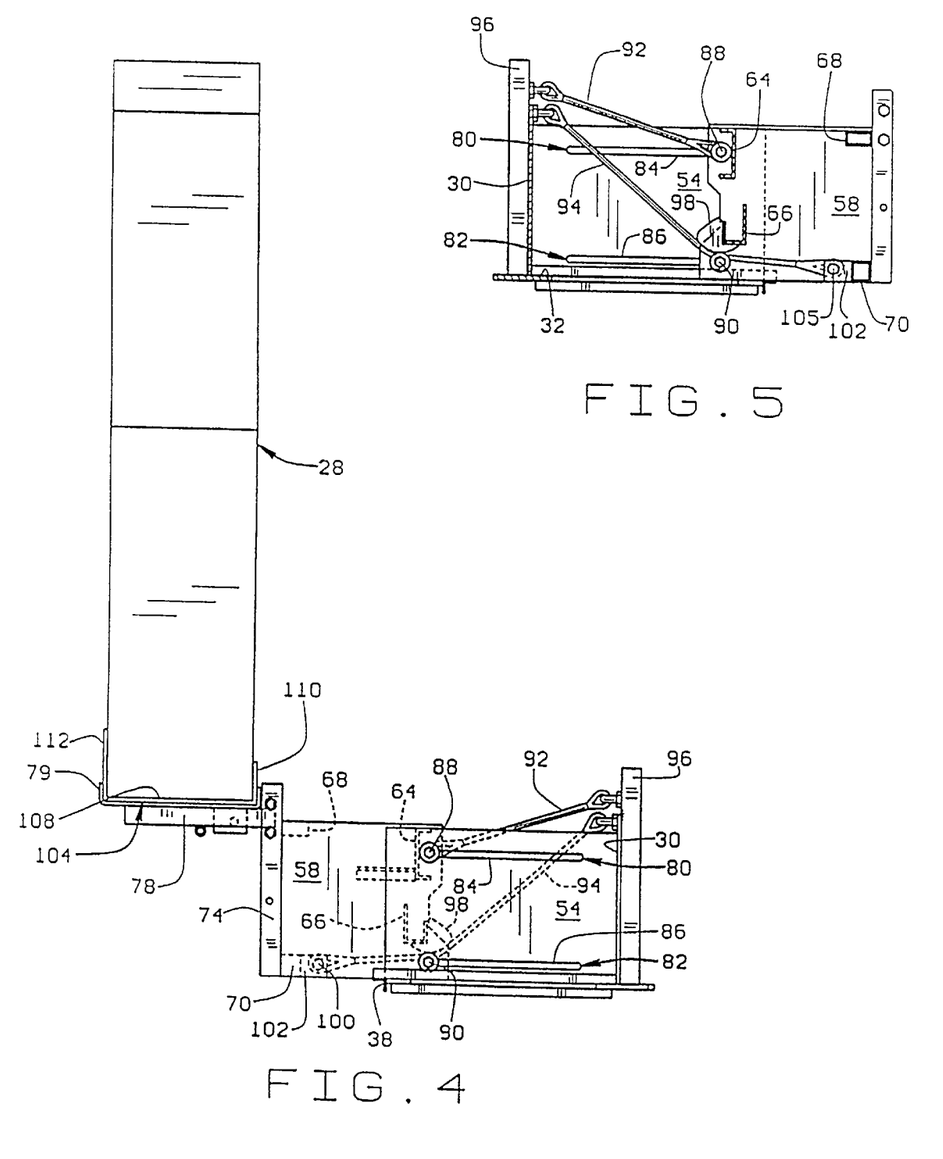
FIG. 4 is a right side elevation view of the crash attenuation system, in its retracted position.
FIG. 5 is a partial longitudinal cross-sectional view of the frame and slider with the collapsible energy absorbing members removed taken along the plane of line 5—5 in FIG. 2.
Figures 6, 7:
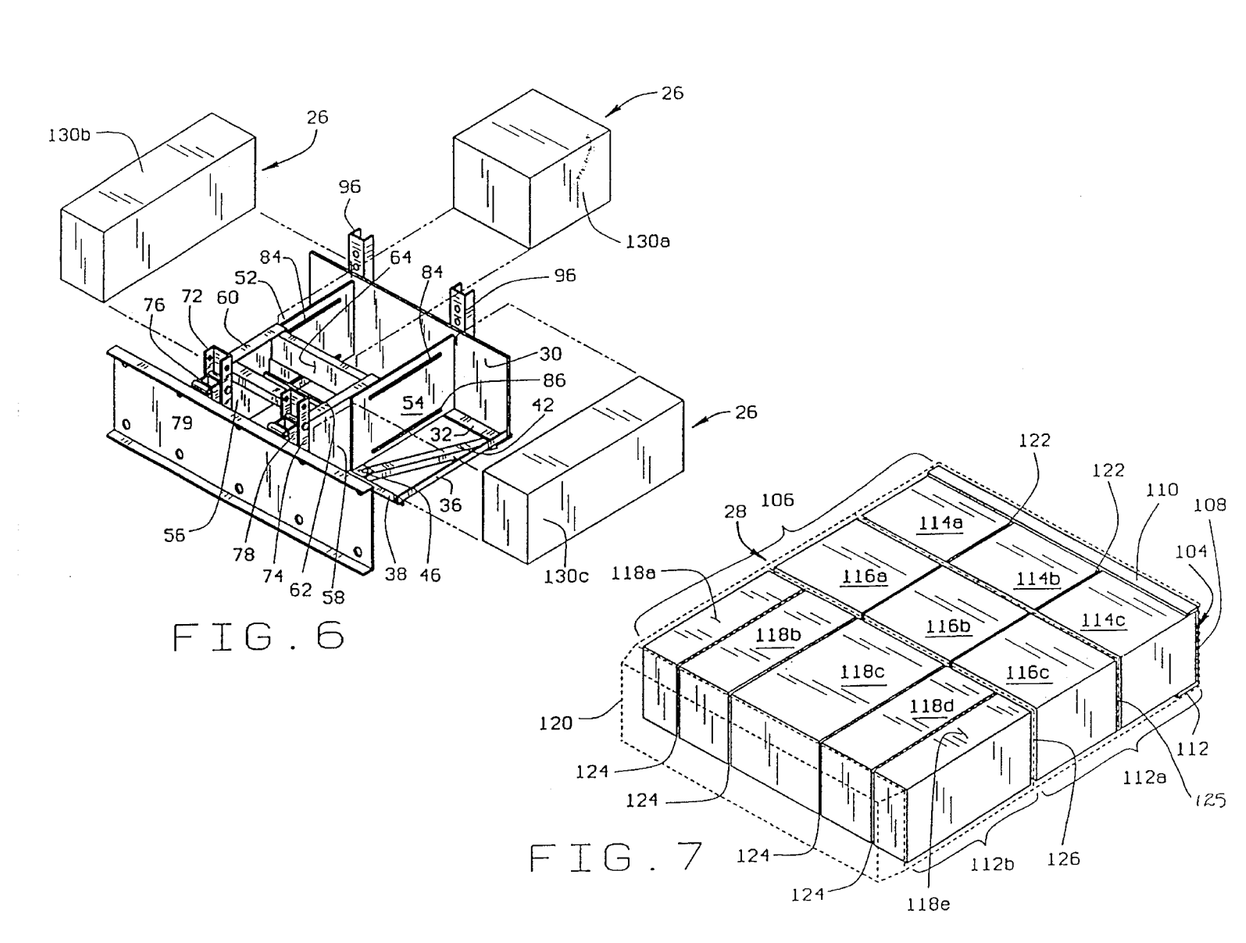
FIG. 6 is a perspective view of the frame an slider with the collapsible, energy-absorbing members removed to show details of the construction.
FIG. 7 is a perspective view of the crash cushion, with the shell removed to show the size and positioning of the individual crash cartridges.
Figure 8:
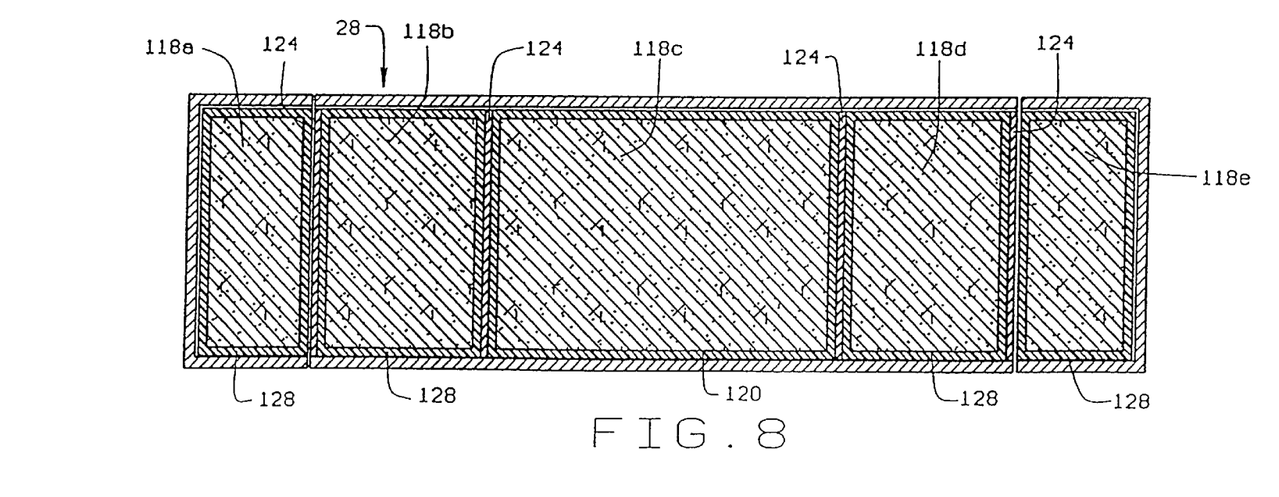
FIG. 8 is a transverse cross sectional view of the crash cushion, taken along the plane of line 8—8 in FIG. 2.

As shown in FIGS. 2, 3, and 6, the frame 22 comprises a back plate 30 adapted for mounting on the vehicle. The back plate 30 has a lip 32 protruding at a right angle distally from its bottom edge. Left and right side members 34 and 36 extend distally from the lip 32 at the left and right sides, respectively, of the frame. A cross member 38 extends between the distal ends of the side members 34 and 36. Left and right tie members 40 and 42 extend at an angle between the lip 32 of the back plate, and tabs 44 and 46 on the cross member 38.

Two flat horizontal strips 48 and 50 (FIGS. 2, 4, and 5) extend distally from the lip 32 of the back plate 30, perpendicular to the cross member 38. Vertical plates 52 and 54 extend distally from the back plate 30 to the cross member 38, generally along the outer edges of the strips 48 and 50. The slider 24 has the ability to slide between the plates 52 and 54, to slide in the proximal (forward) direction, telescoping into the frame 22 under the force of a proximal impact. The slider 24 comprises left and right side panels 56 and 58, each having a lip 60 and 62, respectively, at its top edge that projects laterally toward the other. There are a plurality of cross members extending between the side panels 56 and 58. More specifically, a C-shaped channel member 64 extends horizontally between the left and right side panels, adjacent the top, proximal corners of the panels. A reverse J-shaped channel member 66 extends horizontally between the left and right side panels adjacent the distal edges of the panels, below the C-shaped channel member 64. A rectangular tube 68 extends horizontally between the panels adjacent the top, distal corners of the panels, and a square tube 70 extends horizontally between the panels adjacent the bottom distal corners of the panels.

C-shaped channels 72 and 74 (FIGS. 4, 5, and 6) extend vertically at the left and right sides of the distal end of the slider 24, with the channels facing distally. The top ends of brackets 76 and 78 are pivotally mounted in the channels 72 and 74, respectively, to pivot upwardly. The brackets 76 and 78 each comprise a square tube having a sleeve secured on one face, the sleeve being secured between side walls of one of the C-shaped channels 72 or 74. C-shaped mounting plate 79 is secured on the brackets 76 and 78, for mounting the crash cushion 28.

As shown in FIGS. 1 and 6, either the frame 22 or the slider 24 is provided with tracks, and the other of the frame and the slider is provided with track followers to guide the telescoping motion of the slider proximally into the frame. In this preferred embodiment there are preferably upper and lower tracks 80 and 82 extending horizontally in the plates 52 and 54. These tracks are preferably slots 84 and 86 in the plates. The track followers are slide pins and slide plates attached to slider 24 that fit in these slots. In this preferred embodiment, the track followers are rods 88 and 90 extending laterally from the panels adjacent the upper proximal and lower proximal corners, respectively. These rods extend through the slots 80 and 82, and have a large washer and nut secured on each end to help retain the rods in the slots and prevent the slider from turning, yet permit the rods to slide horizontally within the slots.

Upper and lower support cables 92 and 94 (FIGS. 4 and 5) are provided on each side of the slider to help support the slider. The proximal end of the upper support cable is secured to the frame 22, and more particularly to the upper end of one of two channel members 96 provided on the proximal face of plate 30. The distal end of the upper support cable 92 is secured to the upper rod 88 on the slider. The proximal end of the lower support cable 94 is also secured to the frame 22, and more particularly to the plate 30 and channel member 96 at a point below the attachment of the upper support cable. The lower support cable 94 extends distally around a guide 98 secured on the reverse J-shaped channel member 66, and the distal end of the lower support cable is secured on a bolt 100 projecting from a tab 102 on the cross member 70. The upper and lower support cables help support the slider 24.

As described above and shown in FIG. 7, the crash cushion 28 is mounted on the mounting plate 79. The crash cushion 28 comprises a back plate 104 and an energy absorbing section body 106. The back plate 104 has a vertical section 108, a top section 110 extending over the top proximal edge of the energy absorbing body 106, and a lower section 112 extending under the bottom proximal edge of the energy absorbing body. The energy absorbing body 106 comprises a plurality of individual cartridges. The cartridges are arranged to provide at least two sections 112a and 112b of different impact absorption. The proximal section 112a has a greater impact resistance, and the cartridges forming this section resist any crushing or other damage at lower speed impacts, while the distal section 112b has lesser impact resistance, and the cartridges forming this section are more easily damaged and bear the brunt of low and moderate speed impacts.

The proximal section 112a (FIG. 7) comprises three cartridges 114a, 114b, and 114c. Each of the cartridges 114 is preferably made of layers of hexagonal paper cells. The cells at the proximal end of the cartridges preferably have a 1" cell size, and the cells at the distal end of the cartridge preferably have a ¾" cell size. These materials are sufficiently strong to resist damage if the crash attenuator is impacted at speeds of less than about 30 miles per hour. A suitable material is Hexcomb™ closed cell available from Tenneco Packaging of North Haven, Conn. 06473. Each cartridge is encased in a heat-sealed corrugated plastic container. The container is a single layer of plastic containment manufactured by Data Packaging of Fairfield, N.J. 07004. The cartridges can further be wrapped with for example, plastic sheet and tape to protect them from degradation, single layer wrap 4 mil Polysheet, manufactured by Dow Chemical.

As shown in FIG. 7, the distal section 112b comprises five cartridges 118a, 118b, 118c, 118d, and 118e. Each of the cartridges 118 is preferably made of layers of hexagonal paper cells, having a 1" cell size. This material is readily crushable to absorb energy from impacts at speeds of less than about 30 miles per hour. A suitable material is a Hexcomb™ closed cell encased in a heat-sealed corrugated plastic container of single layer plastic manufactured by Data Packaging. Each cartridge is further protected from degradation by wrapping it with a single layer of 4 mil Polysheet and tape, manufactured by Dow Chemical. An end cap 120 is provided on the distal end of the energy absorbing body 106. The end cap 120 is made of layers of hexagonal paper cells, preferably having a 1½ inch cell size. The end cap 120 is encased in heat-sealed corrugated plastic container. The cap is further covered in a thin (0.035 inch) aluminum sheet. The cartridges 118a and 118e are also covered in thin (0.050 inch) aluminum sheets. The end cap 120 and the cartridges 118a and 118e on the sides of distal section 112 function as "nuisance cushion" sacrificially absorbing minor impacts and abuse, and can be easily replaced. The end cap 120 and the entire cartridges 112a and 112b are preferably painted OSHA yellow special.

The cartridges 114 (FIG. 7) forming the proximal section 112a are separated by two panels 122 of thin aluminum material. Similarly, the cartridge 114 forming the distal section 112b are separated by two panels 124 of thin (0.035 inch) aluminum material. There is also a panel 126 (FIG. 9) separating the proximal and distal sections 112a and 112b. The cartridges 114a, 114b, 114c, 118b, 118c, and 118d are encased in thin (0.035 inch) aluminum skin 128. The skin 128 is preferably painted OSHA yellow special.

There is also at least one energy absorbing member 26 (FIG. 6) provided between the slider 24 and the frame 22 to absorb energy as the slider telescopes into the frame. In this preferred embodiment there are three such member 130a, 130b, and 130c. The member 130a is adapted to fit between the plates 52 and 54, between the slider 24 and the plate 30. The members 130b and 130c are adapted to fit on the outside of the plates 52 and 54, between the plate 30 and the mounting plate 79. As the slider 24 telescopes proximally into the frame 22, the members 130 crush, absorbing the impact energy. Each of the members 130 is preferably made of stacks of hexagonal paper cells, having a ⅝ inch cell size. A suitable material is Hexcomb closed cell encased in a heat-sealed corrugated plastic container of single layer plastic manufactured by Data Packaging. The cartridges are further protected from degradation by wrapping it with a single layer of 4 mil Polysheet tape, manufactured by Dow Chemical. All the cartridges 130 are wrapped in their (0.035 inch) aluminum to protect from the elements and road damage, and are preferably painted OSHA yellow special.

Figure 9:
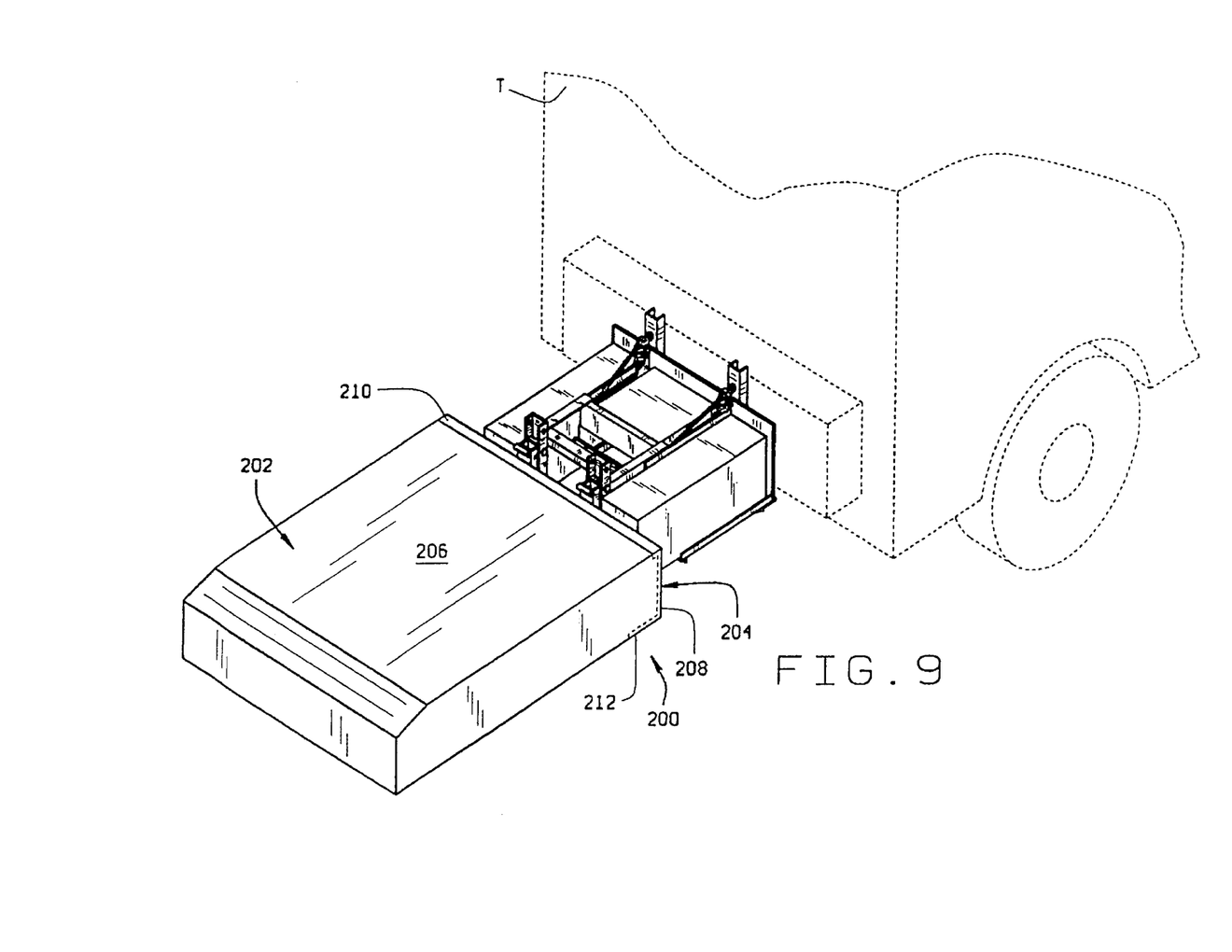
FIG. 9 is a perspective view of second embodiment of a crash attenuation system constructed according to the principles of the present invention, shown as it would be mounted on a vehicle.

A second embodiment of a crash attenuator constructed according to the principles of this invention is indicated generally as 200 in FIG. 9. As shown in FIG. 1, the crash attenuator 200 is adapted to be mounted on a vehicle, such as truck T, and deployed in order to arrest the motion of a vehicle colliding with the attenuator and dissipate its impact energy.

Figure 10:
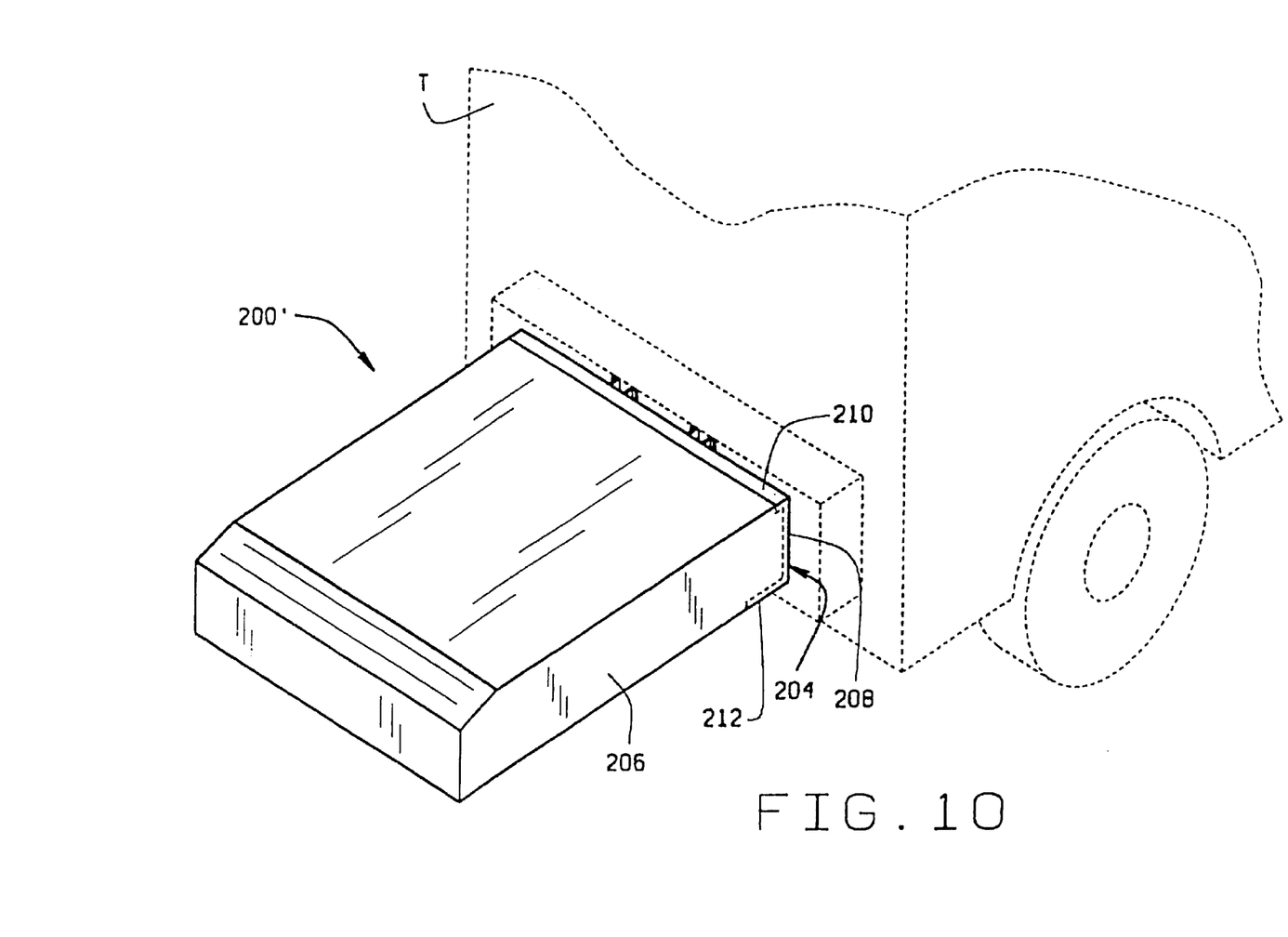
FIG. 10 is a perspective view of an alternate construction of the second embodiment.

The crash attenuator 200 is similar in construction to crash attenuator 20, and corresponding reference numerals indicate corresponding parts. However, rather than crash cushion 28, the crash attenuator 200 includes a crash cushion 202 mounted on the mounting plate 79. The crash cushion 202 comprises a back plate 204 and an energy absorbing section body 206. The back plate 204 has a vertical section 208, a top section 210 extending over the top proximal edge of the energy absorbing body 206, and a lower section 212 extending under the bottom proximal edge of the energy absorbing body. FIG. 10 shows an alternative construction of the crash attenuator 200' in which the crash cushion is hingedly mounted on the back of the truck T, without the slider 24, to pivot upwardly about an axis extending transversely with respect to the truck and the crash attenuator, so that when not in use, the attenuator extends generally vertically upwardly against the back of the truck.

The energy absorbing body 206 comprises a plurality of individual cartridges. The cartridges are arranged to provide at least two sections, and in this second preferred embodiment, at least three longitudinally spaced sections 214a, 214b, and 214c, each having differing impact absorption capacity. The proximal section 214a preferably has the greater impact resistance, and the cartridges forming this section resist any crushing or other damage at lower speed impacts, while the distal section 214c has lesser impact resistance, and the cartridges forming this section are more easily damaged and bear the brunt of low and moderate speed impacts. Intermediate section 214b has an intermediate impact resistance, and the cartridges forming this section generally resist minor impacts, and crush under intermediate and severe impacts.

The proximal section 214a (FIG. 11) comprises three cartridges 216a, 216b, and 216c. Each of the cartridges 216 is preferably made of layers of hexagonal paper cells. In the preferred embodiment, the cartridges are made of two different sizes of cells, the proximal half of the cartridges comprise ¾ inch cells, and the distal half of the cartridges comprise 1 inch cells. The cells are oriented so that their longitudinal axes are parallel with the direction of intended impact, i.e. parallel (with the longitudinal axes of the crash cushion 206. This material is sufficiently strong to resist damage if the crash attenuator is impacted at speeds of less than about 30 miles per hour. A suitable material is Hexcomb™ closed cell available from Tenneco Packaging of North Haven, Conn. 06473. The cartridges are build up from 3 inch thick layers of paper cell material having facing a paper facing on the top and bottom. The facings of adjacent layers are glued together to form a block of the appropriate size. Each of the cartridges 216a, 216b, and 216c is encased in a heat-sealed corrugated plastic container. The container is a single layer of plastic containment manufactured by Data Packaging of Fairfield, N.J. 07004. The cartridges 216a, 216b, and 216c can further be wrapped with, for example, plastic sheet and tape to protect them from degradation, such as a single layer wrap 4 mil Polysheet, manufactured by Dow Chemical.

The intermediate section 214b (FIG. 11) comprises three cartridges 218a, 218b, and 218c. Each of the cartridges 218 is preferably made of layers of hexagonal paper cells. In the preferred embodiment, the cartridges are made of two different sizes of cells, the proximal half of the cartridges comprise 1 inch cells, and the distal half of the cartridges comprise 1¼ inch cells. The cells are oriented so that their longitudinal axes are parallel with the direction of intended impact. This material is more readily crushable than the material in the cartridges 216 to absorb energy from impacts at speeds of less than about 45 miles per hour. A suitable material is Hexcomb™ closed cell. The cartridges are build up from 3 inch thick layers of paper cell material having facing a paper facing on the top and bottom. The facings of adjacent layers are glued together to form a block of the appropriate size. Each of the cartridges 218a, 218b, and 218c encased in a heat-sealed corrugated plastic container of single layer plastic manufactured by Data Packaging. The cartridges 218a, 218b, and 218c can further be wrapped with for example, plastic sheet and tape to protect them from degradation, such as a single layer of 4 mil Polysheet and tape, manufactured by Dow Chemical.

The distal section 214c (FIG. 11) comprises three cartridges 220a, 220b, and 220c. Each of the cartridges 220 is preferably made of layers of hexagonal paper cells, having a 1½ inch cell size. The cells are oriented so that their longitudinal axes are parallel with the direction of impact. This material is more readily crushable than the material in the cartridges 216 and 218 to absorb energy from impacts at speeds of less than about 30 miles per hour. A suitable material is a Hexcomb™ closed cell. The cartridges are build up from 3 inch thick layers of paper cell material having facing a paper facing on the top and bottom. The facings of adjacent layers are glued together to form a block of the appropriate size. The cartridge is encased in a heat-sealed corrugated plastic container of single layer plastic manufactured by Data Packaging. The cartridges 220a, 220b, and 220c can further be wrapped with, for example, plastic sheet and tape to protect them from degradation, such as single layer of 4 mil Polysheet and tape, manufactured by Dow Chemical.

Figure 12:
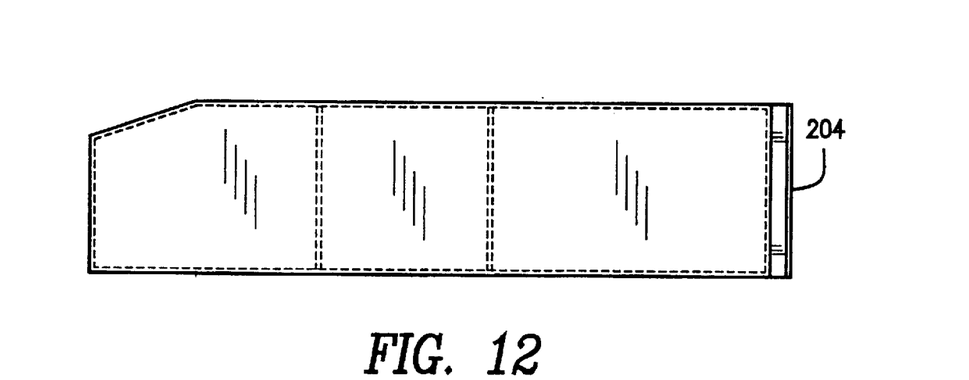
FIG. 12 is a side elevation view of the cushion used in the second embodiment.

As best shown in FIG. 12. The cartridges 220a, 220b and 220c have a beveled top rear edge. This provides a space at the rear of the crash cushion for mounting warning lights.

The three cartridges 216 (FIG. 11) forming the proximal section 214a are separated by two panels 222 of thin (0.051 inch) aluminum material. The three cartridges 218 forming the intermediate section 214b are separated by two panels 224 of thin (0.051 inch) aluminum material. The three cartridges 220 forming the distal section 214c are separated by two panels 226 of thin (0.051 inch) aluminum material. There is a divider 228 between the proximal section 214a and the intermediate section 214b, and there is a divider 230 between the intermediate section 214b and the distal section 214c. The dividers 230 and 228 are of a thin (0.51 inch) aluminum material.

Figure 11:
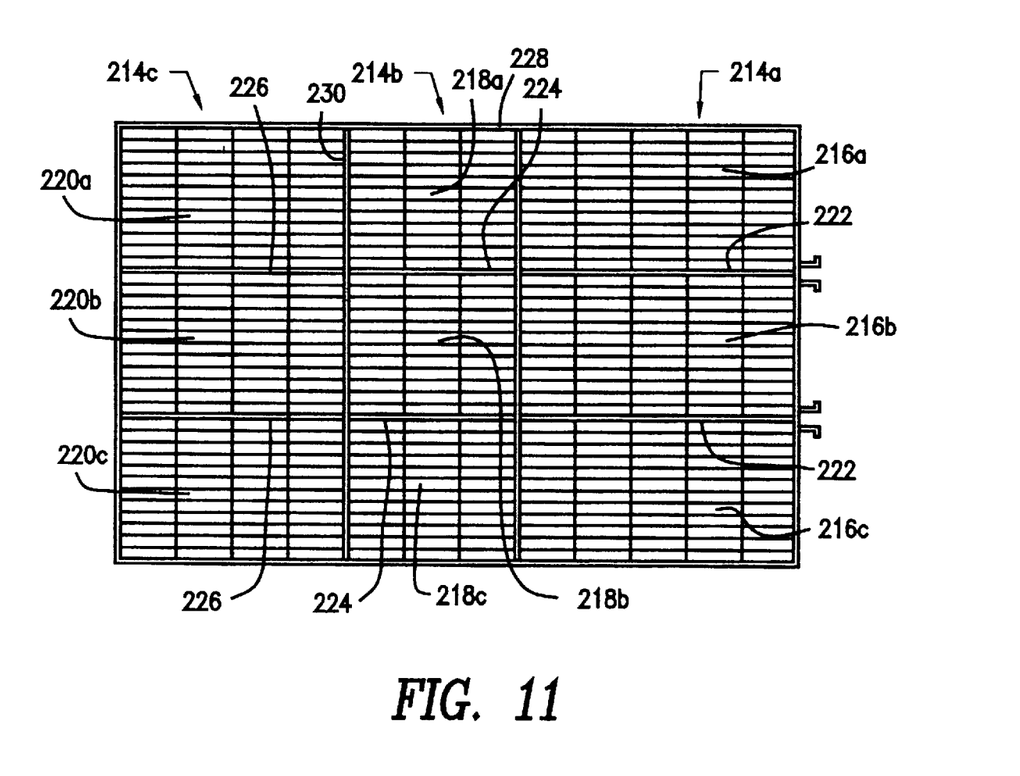
FIG. 11 is a horizontal cross-sectional view of the cushion used in the second embodiment.

The cartridges 216, 218, and 220 the panels 222, 224, and 226, and the dividers 228 and 230 are all encased in a thin aluminum skin 128. The skin is about 0.035 inches thick on the top and rear of the cushion; 0.051 inches thick on the bottom of the cushion; and 0.062 inches thick on the sides of the cushion. The extra thickness on the bottom and sides helps the cushion resist vibration encountered in transportation on the back of the truck T. The skin 128 is preferably painted OSHA yellow special.

In the second preferred embodiment, the energy absorbing body 206 is 114 inches long and 90 inches wide. The energy absorbing body 206 is 34 inches high at the proximal end, and 27 inches high at the distal end, the top surface sloping downwardly over the distal 18 inches of the energy absorbing body.

The cartridges 216a, 216b, and 216c are 46½ inches long, 28½ inches wide, and 32 inches high. The cartridges 218a, 218b, 218c are 28½ inches long, 28½ inches wide, and 32 inches high. The cartridges 220a, 220b, and 220c are 34½ inches long, 28½ inches wide, and 32 inches high at the proximal side and 25 inches high at the distal side.

OPERATION

In operation, the crash attenuator 20 or 200 or 200' is mounted on the back of a vehicle, for example a truck T. While the truck T is being transported, the crash cushion 28 of attenuator 20, and the crash cushion 202 of attenuator 200 or 200' is maintained in its upright (non-operation) position, to make the truck easier to maneuver. Once the truck is at the work site, and crash cushion is lowered to its horizontal, deployed position, where it projects horizontally outwardly from the truck.

Should a vehicle strike the crash attenuator 20 at low speed, for example less than 5 miles per hour, the end cap 120 would be crushed, but the remainder of the crash cushion, and the crash attenuator could remain basically intact. The crash attenuator could be quickly refurbished for service by replacing the end cap 120. If the attenuator were impacted at a greater speed, for example between 5 and 30 miles per hour, the distal section 112b of the crash cushion would collapse to absorb the energy of this impact, but the proximal portion 112a would generally resist any damage. The crash attenuator could then be refurbished simply by replacing the crash cushion, but the cartridges 114 could be reused. If the attenuator 20 were impacted at even greater speeds up to its 65 m.p.h. design, then the entire crash cushion might be collapsed, and eventually the slider 24 would be telescoped into the frame 22, collapsing the members 130.

The crash attenuator end cap 120 provides crash attenuation for impacts over a wide variety of speeds. The construction of the crash attenuator allows the unit to be quickly and inexpensively refurbished after an impact, in contrast to many prior art attenuators which were simply destroyed by even a minor impact. Moreover, the construction of the attenuator reduces wear and tear on the energy absorbing bodies which in prior art attenuators would tend to quickly degrade from vibration and exposure to the elements. The attenuator, through the provision of the slider and frame, even provides some crash attenuation capability when the crash cushion is not in its deployed position.

Should a vehicle strike the crash attenuator 200 or 200', the crash cushion 206 crushes. Because of the differing crash attenuation capacity of the cartridges in the sections 114a, 114b, and 114c, the cartridges crush to different degrees depending upon the severity of the impact. The undamaged cartridges can be re-used in new crash cushions.

The increasing crush resistance of the three sections 114a, 114b, and 114c provide a smooth "ride-down" for an impacting vehicle.

A truck properly weighted and equipped with a crash attenuator of the present invention can decelerate a vehicle and absorb the impact of a collision. By safely stopping the colliding vehicle, the attenuator increases the probability that the operator and passengers of the vehicle will survive the collision, in addition to protecting workers at the site from being struck by the errant vehicle.

The inventor has found that its unique construction meets the NCHRP—Test 350, Level 3.

What is claimed:

1. A crash cushion for at least partially absorbing the impact energy of a vehicle striking the cushion, the cushion comprising: an elongate shell containing crushable crash cartridges, said shell having proximal and distal ends; first and second dividers extending transversely across the shell, dividing the shell into proximal, intermediate, and distal sections, each section having a proximal wall and a distal wall, the proximal end of the shell and the first divider forming the proximal and distal walls of the proximal section having a first longitudinal length, the first and second dividers forming the proximal and distal walls of the intermediate section having a second longitudinal length, and the second divider and the distal end of the shell forming the proximal and distal walls of the distal section having a third longitudinal length; three crash cartridges formed in each of said proximal, intermediate and distal sections, each cartridge extending from its respective proximal wall to its respective distal wall, and comprising a plurality of cells formed from a block of cell paper material, each cell within each block of cell paper material having a given size, the cell paper material in the cartridges oriented with the longitudinal direction of the cells generally perpendicular to the proximal and distal walls of the section; the cells in the cartridges in the intermediate section having a given size which is larger than the size of the cells in the cartridges in the proximal section, and the cells in the cartridges in the distal section having a given size which is larger than the size of the cells in the cartridges in the intermediate section; and two panels extending between the proximal and distal walls of each section separating adjacent cartridges.

2. The crash cushion according to claim 1 wherein the shell is made of an aluminum sheet between about 0.035 and about 0.062 inches thick.

3. The crash cushion according to claim 2 wherein the dividers are made of an aluminum sheet between about 0.035 and about 0.051 inches thick.

4. The crash cushion according to claim 1 wherein the dividers are made of an aluminum sheet between about 0.035 and about 0.051 inches thick.

5. The crash cushion according to claim 1 wherein the cartridges each comprise layers of paper cell material laminated together.

6. The crash cushion according to claim 5 wherein at least some of said cartridges comprise layers of paper cell material of at least two different cell sizes such that cells of a first size and other cells of a second size different from said first size are formed in at least some of said cartridges.

7. The crash cushion according to claim 6 wherein the cartridges in the proximal and intermediate sections comprise layers of paper cell material of at least two different cell sizes.

8. The crash cushion according to claim 7 wherein cartridges in the proximal section comprise layers of cells of a first size and a second size, the second sized cells being larger than the first-sized cells; and wherein the cartridges in the intermediate section comprise layers of cells of said second size and a third size, the third-sized cells being larger than the second-sized cells.

9. The crash cushion according to claim 7 wherein the cartridges in the proximal section comprise paper cell material having cell sizes of ¾ inch and 1 inch.

10. The crash cushion according to claim 7 wherein the cartridges in the intermediate section comprise paper cell material having cell sizes of 1 inch and 1¼ inch.

11. The crash cushion according to claim 1 wherein the cells in the cartridges in the distal section have a paper cell material having cell sizes of 1½ inches.

12. The crash cushion according to claim 1 wherein the first longitudinal length of the proximal section is longer than the third longitudinal length of the distal section, and the third longitudinal length of the distal section is longer than the second longitudinal length of the intermediate section.

13. A crushable, energy-absorbing crash cushion adapted to be mounted to a mobile vehicle for protecting a mobile vehicle by arresting the motion of another vehicle colliding with the cushion and dissipating its impact energy, the cushion comprising:

an elongated deformable housing having a pair of dividers spaced apart from one another and in parallel alignment, said pair of dividers extending transversely across an interior of said housing to divide the housing into proximal, intermediate, and distal sections, each section having a proximal wall and a distal wall, two panels extending between the proximal and distal walls of each said section to define cell areas, wherein three cell areas are defined by said two panels and said pair of dividers for each of said proximal, intermediate, and distal sections;

a crushable cartridge formed within each said cell area within said housing, each cartridge comprising a block of cell paper material in which is formed a plurality of cells each of a given size, the cell paper material in each cartridge oriented with the longitudinal direction of the cells generally perpendicular to the proximal and distal walls of the section, wherein the cells in the cartridges associated with the intermediate section are of a size larger than the cells in the cartridges associated with the proximal section, and wherein the cells in the cartridges in the distal section are of a size larger than the cells in the cartridges in the intermediate section.

14. A crushable, energy-absorbing crash cushion for arresting the motion of a vehicle colliding with the cushion and dissipating its impact energy, the cushion comprising:

an elongated deformable housing having a pair of dividers spaced apart from one another and in parallel alignment, said pair of dividers extending transversely across an interior of said housing to divide the housing into proximal, intermediate, and distal sections, each section having a proximal wall and a distal wall, two panels extending between the proximal and distal walls of each said section to define cell areas, wherein three cell areas are defined by said two panels and said pair of dividers for each of said proximal, intermediate, and distal sections;

a crushable cartridge formed within each said cell area, each cartridge comprising a block of cell paper material forming a plurality of cells within each cartridge, wherein said plurality of cells associated with at least one said cartridge includes cells of a first size and other cells of a second size different from said first size.

15. A crash cushion for at least partially absorbing the impact energy of a vehicle striking the cushion, the cushion comprising: an elongate shell containing crushable crash cartridges, said shell having proximal and distal ends; first and second dividers extending transversely across the shell, dividing the shell into proximal, intermediate, and distal sections, each section having a proximal wall and a distal wall, the proximal end of the shell and the first divider forming the proximal and distal walls of the proximal section having a first longitudinal length, the first and second dividers forming the proximal and distal walls of the intermediate section having a second longitudinal length, and the second divider and the distal end of the shell forming the proximal and distal walls of the distal section having a third longitudinal length; three crash cartridges formed in each of said proximal, intermediate and distal sections, each cartridge extending from its respective proximal wall to its respective distal wall, and comprising a plurality of cells formed from a block of cell paper material, the cell paper material in the cartridges oriented with the longitudinal direction of the cells generally perpendicular to the proximal and distal walls of the section; the cells in the cartridges in the intermediate section having a given size which is larger than the size of the cells in the cartridges in the proximal section, and the cells in the cartridges in the distal section having a given size which is larger than the size of the cells in the cartridges in the intermediate section; and two panels extending between the proximal and distal walls of each section separating adjacent cartridges; and wherein in at least one of said sections, said plurality of cells include cells of a first size and a second size, the second sized cells being larger than the first sized cells.

16. A crash cushion for at least partially absorbing the impact energy of a vehicle striking the cushion, the cushion comprising: an elongate shell containing crushable crash cartridges, said shell having proximal and distal ends; first and second dividers extending transversely across the shell, dividing the shell into proximal, intermediate, and distal sections, each section having a proximal wall and a distal wall, the proximal end of the shell and the first divider forming the proximal and distal walls of the proximal section having a first longitudinal length, the first and second dividers forming the proximal and distal walls of the intermediate section having a second longitudinal length, and the second divider and the distal end of the shell forming the proximal and distal walls of the distal section having a third longitudinal length; three crash cartridges formed in each of said proximal, intermediate and distal sections, each cartridge extending from its respective proximal wall to its respective distal wall, and comprising a plurality of cells formed from a block of cell paper material, the cell paper material in the cartridges oriented with the longitudinal direction of the cells generally perpendicular to the proximal and distal walls of the section; the cells in the cartridges in the intermediate section having given dimensions which are larger than the dimensions of the cells in the cartridges in the proximal section, and the cells in the cartridges in the distal section having given dimensions which are larger than the dimensions of the cells in the cartridges in the intermediate section; and two panels extending between the proximal and distal walls of each section separating adjacent cartridges; and wherein the second longitudinal length of the intermediate section is shorter than the first and third longitudinal lengths of the proximal and distal sections, respectively.

17. The crash cushion according to claim 1, wherein at least some of said plurality of cells are of a hexagonal shape.

* * * * *